US010537200B2

(12) United States Patent
Ait Bouziad et al.

(10) Patent No.: US 10,537,200 B2
(45) Date of Patent: Jan. 21, 2020

(54) BEVERAGE PREPARATION DEVICE FOR PREPARATION OF A COOLED AND FOAMED BEVERAGE

(71) Applicant: NESTEC S.A., Vevey (CH)

(72) Inventors: Youcef Ait Bouziad, Echandens (CH); Alexa Perrin, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 509 days.

(21) Appl. No.: 15/310,587

(22) PCT Filed: May 7, 2015

(86) PCT No.: PCT/EP2015/060067
§ 371 (c)(1),
(2) Date: Nov. 11, 2016

(87) PCT Pub. No.: WO2015/173113
PCT Pub. Date: Nov. 19, 2015

(65) Prior Publication Data
US 2017/0079462 A1    Mar. 23, 2017

(30) Foreign Application Priority Data
May 13, 2014 (EP) .................................. 14167999

(51) Int. Cl.
*A47J 31/44* (2006.01)
*A47J 43/046* (2006.01)
(Continued)

(52) U.S. Cl.
CPC .......... *A47J 31/3623* (2013.01); *A47J 31/40* (2013.01); *A47J 31/4403* (2013.01);
(Continued)

(58) Field of Classification Search
USPC ...... 241/112, 166, 167; 366/294, 309, 329.3
See application file for complete search history.

(56) References Cited

U.S. PATENT DOCUMENTS 4,919,041 A * 4/1990 Miller .................. A47J 31/007
99/279
5,090,816 A * 2/1992 Socha .................. B01F 7/0035
366/293
(Continued)

FOREIGN PATENT DOCUMENTS

CN    102316776 A    1/2012
CN    203106806 U    8/2013
(Continued)

*Primary Examiner* — Ibrahime A Abraham
*Assistant Examiner* — John J Norton
(74) *Attorney, Agent, or Firm* — K&L Gates LLP (57) ABSTRACT

The present invention relates to a cold beverage preparation device (20), the device comprising an open cooling reservoir (5) for receiving a liquid beverage, cooling means (15) associated to the cooling reservoir (5) for cooling at least part of an internal surface of the cooling reservoir, a rotational stirring member (16) arranged in the cooling reservoir (5) for mixing or foaming the liquid depending on the speed of rotation of the member, and a rotational scraping member (17) arranged in the cooling reservoir (5) for scraping the internal surface of the cooling reservoir, wherein the rotational stirring member (16) and the scraping member (17) are designed for being driven independently within the cooling reservoir (5) of the device.

16 Claims, 3 Drawing Sheets

(51) Int. Cl.
    *A47J 43/07*         (2006.01)
    *A47J 43/08*         (2006.01)
    *A47J 31/36*         (2006.01)
    *A47J 31/40*         (2006.01)

(52) U.S. Cl.
    CPC ......... *A47J 31/4496* (2013.01); *A47J 43/046* (2013.01); *A47J 43/0465* (2013.01); *A47J 43/0722* (2013.01); *A47J 43/087* (2013.01)

(56) References Cited

U.S. PATENT DOCUMENTS

| | | | |
|---|---|---|---|
| 6,050,720 A * | 4/2000 | Tuyuki | B01F 7/00641 366/264 |
| 2007/0051248 A1 | 3/2007 | Lee et al. | |
| 2011/0030564 A1 * | 2/2011 | Cocco | A47J 31/3671 99/323.3 |
| 2012/0294108 A1 | 11/2012 | Dickson, Jr. et al. | |
| 2013/0061763 A1 * | 3/2013 | Piai | A47J 31/44 99/295 |

FOREIGN PATENT DOCUMENTS

| | | |
|---|---|---|
| CN | 103417114 A | 12/2013 |
| DE | 10048535 | 2/2002 |
| EP | 1533023 | 5/2005 |
| WO | 2010023312 | 3/2010 |
| WO | 2011116931 | 9/2011 |

* cited by examiner

BEVERAGE PREPARATION DEVICE FOR PREPARATION OF A COOLED AND FOAMED BEVERAGE

CROSS REFERENCE TO RELATED APPLICATIONS

The present application is a National Stage of International Application No. PCT/EP2015/060067, filed on May 7, 2015, which claims priority to European Patent Application NO. 14167999.3, filed on May 13, 2014, the entire contents of which are being incorporated herein by reference.

FIELD OF THE INVENTION

The present invention relates to a beverage preparation device for preparing a beverage from a beverage ingredients containing capsule. In particular, the present invention relates to a device for conveniently preparing a cold, mixed and optionally foamed beverage.

BACKGROUND OF THE INVENTION

Devices for preparation of a hot, foamed beverage such as a foamed milk beverage are well-known in the prior art. These devices comprise an essentially cylindrical vessel or receptacle in which centrally arranged foaming means are present. The devices are further equipped with heating means at a bottom portion thereof in order to enable a simultaneous heating and foaming of the beverage contained in the vessel upon rotation of the foaming means. The heating means are usually arranged to heat the beverage to a predefined temperature, whereby a setting or adaption of the heating temperature is not enabled for the consumer.

Dependent on taste preferences, the consumer may however want to prepare a beverage at a different temperature, in particular at a lower temperature than a pre-set standard temperature of the device. In particular, the user may want to prepare a cooled or iced beverage, while optionally enabling mixing and/or foaming of the beverage.

It is known in the state of the art, for example as per document US 2012/294108 A1, a blending apparatus comprising a blending jar and a lid. The blending apparatus comprises a mixing blade within its internal volume and the lid comprises a scraper adjacent to the internal surface of the blending jar.

For this reason, a solution is sought-after which enables the convenient preparation of a cooled mixed or foamed beverage. The present invention also seeks to address further problems as will become apparent in the following description.

OBJECT AND SUMMARY OF THE INVENTION

In a first aspect, the invention relates to a cold beverage preparation device, the device comprising an open cooling reservoir for receiving a liquid beverage, cooling means associated to the cooling reservoir for cooling at least part of an internal surface of the cooling reservoir, a rotational stirring member arranged in the cooling reservoir for mixing or foaming the liquid depending on the speed of rotation of the member, and a rotational scraping member arranged in the cooling reservoir for scraping the internal surface of the cooling reservoir, wherein the rotational mixing member and the scraping member are designed for being driven independently within the cooling reservoir of the device.

The beverage preparation device according to the invention enables the facilitated and convenient preparation of a cold mixed and optionally foamed beverage. Thereby, the stirring member is designed to enable the mixing or foaming of the beverage filled into the cooling reservoir, while the scraping member being an additional member to the stirring member is designed for scraping the internal surface of the reservoir. The scraping member is preferably designed and arranged for removing ice crystals from the internal surface of the reservoir as the beverage is cooled. Accordingly, a homogenous texture and cooling of the resulting beverage is obtained.

The cooling means preferably comprise a common refrigerating circuit comprising a compressor, a condenser, an evaporator and a valve or capillary tube. The cooling means preferably comprise a cooling unit such as an evaporator that is arranged about the circumference of the sidewall of the cooling reservoir. Preferably, the cooling unit is arranged at a serpentine or helical arrangement about the circumference of the sidewall of the reservoir.

The cooling means are preferably adapted for cooling the internal surface of the cooling reservoir to a temperature of between 5 to −30° C. Thereby, cooling means are preferably connected to a control unit of the device that controls the particular temperature to which the internal surface is cooled. The control unit may be designed for applying a particular preferred cooling temperature dependent on a user selection via e.g. a user interface of the device. Thereby, the cooling means may set the cooling temperature for an iced coffee product to between 0° C. to 5° C. For a granita product, the cooling temperature may be set to between −2° C. and −10° C.

In a preferred embodiment, the rotational stirring member and the scraping member are designed for being driven independently within the cooling reservoir of the device. The rotational stirring member and scraping member are preferably designed for being controlled independently at different times, for different time intervals or periods, at different speeds and/or in different directions. The stirring member is preferably designed to be rotated at a higher rotational speed than the scraping member. In particular, the stirring member 16 is preferably driven at a rotational speed of between 100 to 5000 rpm. The scraping member 17 is preferably driven at a rotational speed of between 30 to 200 rpm. The stirring member 16 and the scraping member 17 can rotate in the same sense, either clockwise or anticlockwise, or they can each rotate in a different sense.

The stirring member and the scraping member are preferably arranged to rotate about a common axis of rotation. The stirring member and the scraping member are preferably driven by dedicated driving means such as an electric motor. Thereby, each member is preferably connected to an individual driving means. The connection between the stirring and scraping member and the respective driving means is preferably selectively obtainable upon engaging the cooling reservoir in a dedicated support means of the device.

The rotating stirring member comprises an essentially disc-shaped base member arranged centrally in the bottom area of the cooling reservoir. The disc-shaped base member preferably comprises a plurality of mixing apertures. The mixing apertures are preferably designed to enable a mixing and/or foaming of the beverage contained in the cooling reservoir. The mixing apertures are preferably slanted recesses designed for re-directing liquid arranged below the disc-shaped base member at least partially towards an upper surface of the disc-shaped base member. The foaming properties of stirring member are preferably dependent on the rotational speed of the stirring member.

The scraping member preferably comprises a peripheral scraping beam protruding from a base portion of the scraping member. The base portion of the scraping member may be a disc-shaped member that is preferably arranged below the rotating stirring member of the device. Thereby, the disc-shaped member of the scraping member preferably comprises a larger radial extension than the disc-shaped base of the stirring member.

The scraping beam is preferably arranged in an orientation essentially parallel to a rotational axis of the cooling reservoir. The scraping beam preferably comprises an outer surface which is of conformal shape with the internal surface of the reservoir. Thereby, said outer surface preferably at least partially engages with the internal surface of the reservoir during rotation of the scraping member in order to remove ice crystals that may form on the internal cooling surface of the reservoir.

The scraping member preferably comprises a peripheral driving axle extending through a bottom surface of the cooling reservoir. The driving axle is connected or selective connectable to the driving means of the scraping member which are preferably arranged in a bottom portion of the device.

The stirring member preferably comprises a central driving axle extending through a bottom surface of the cooling reservoir. The central driving axle is connected or selective connectable to the driving means of the stirring member which are preferably arranged in a bottom portion of the device.

In an alternative embodiment, the stirring member is driven magnetically within the cooling reservoir. Thereby, the stirring member may be magnetically engaged by dedicated driving means that are arranged outside of the cooling reservoir. Accordingly, the stirring member is void of a driving axle extending through a bottom surface of the cooling reservoir.

The beverage preparation device may further comprise heating means arranged in a bottom portion or wall of the cooling reservoir for selectively heating the liquid. The heating means may comprise a thick film heater layered on the bottom wall of the reservoir or a ceramic heater.

The cooling reservoir of the device is preferably selectively connectable to a support means of the cooling means. Accordingly, after the beverage preparation process is finished, the user may disconnect the cooling reservoir from the support means and pour the resulting beverage from the cooling reservoir into a dedicated receiving receptacle. The cooling module may as well comprise a dedicated outlet for dispensing the resulting cooled beverage into a dedicated receiving receptacle.

In a further aspect, the invention relates to a system comprising the cold beverage preparation device as described above and further comprising a hot extraction module comprising a brewing unit for injection of hot liquid into a beverage ingredients containing capsule, a hot beverage outlet connected to the brewing unit for dispensing of a hot extracted beverage, wherein the hot beverage outlet and the open cooling reservoir of the device are arranged moveably relative to each other such that the hot extracted beverage may be selectively dispensed from the hot beverage outlet into the open cooling reservoir in at least one relative position of the hot beverage outlet and the cooling reservoir.

The system according to the invention enables the selective preparation of a hot or cold beverage dependent on the relative position of the hot beverage outlet and the open cooling reservoir with respect to each other. Accordingly, a convenient preparation of a beverage at a desired hot or cold temperature is enabled.

According to the invention, the hot extraction module is preferably designed for preparation of a hot beverage, in particular for the preparation of a coffee or tea beverage by means of injection of hot and preferably pressurized liquid into a beverage ingredients containing capsule. Thereby, the hot extraction module is preferably adapted for applying the optimal extraction respectively brewing temperature for the particular beverage type. This is in particular important for tea or coffee beverages based on ingredients contained within the capsule which are to be prepared at a relative high temperature of between 80-95° C. Accordingly, optimal extraction respectively brewing parameters are provided for the beverage type, while the consumer may choose between the provision of the beverage in a hot or cold state respectively temperature.

The hot beverage extraction module of the system preferably comprises a liquid reservoir for providing a liquid such as water to the brewing unit, a pump and a heating means such as a thermoblock which are in fluid connection with the liquid reservoir. The pump and the heating means are connected to the brewing unit of the extraction module in order to enable the provision of a heated and preferably pressurized liquid to the brewing unit.

The brewing unit of the hot extraction module is adapted for receiving and enclosing a capsule containing a predefined portion of beverage ingredients such as coffee powder. The capsule for being used in conjunction with the hot extraction module preferably comprises a truncated cone-shaped body portion having a flange-like rim extending from the body portion, whereby a sealing membrane is connected to the flange-like rim. The capsule is preferably made from aluminum, but may as well be made from different material such as plastic or biodegradable polymer material.

In a preferred embodiment, the brewing unit of the hot extraction module is adapted for assuming a position relative to the cooling reservoir in which the hot beverage is directly dispensed from the hot beverage outlet into a receiving receptacle. Thereby, the hot beverage outlet is preferably comprised by the brewing unit respectively integrally formed therewith.

In a preferred embodiment, the brewing unit and the hot beverage outlet are arranged in a rotatable movable manner at the hot extraction module. The brewing unit of the hot extraction module is preferably designed to rotate about a vertical axis of rotation into a predefined position. The brewing unit may be arranged movable manually or automatically, e.g. in response to a button or switch that is activated by the user of the system.

The brewing unit of the hot extraction module is preferably adapted to assume at least two positions relative to the cold beverage preparation device, a first direct hot beverage dispensing position and a second cold beverage preparation position respectively an indirect beverage preparation position. In the first hot beverage dispensing position, the system is configured for delivering the extracted beverage directly from the hot beverage outlet into a receptacle such as a coffee cup. In the second cold beverage preparation position, the system is configured for preparing a cold or chilled beverage in the cooling reservoir of the cold beverage preparation device.

In the first direct hot beverage dispensing position, the hot beverage outlet is preferably arranged outside of the contours of a receiving opening of the cooling reservoir when seen from above. A receiving receptacle may thus be placed below the hot beverage outlet in order to collect the beverage drained from the outlet.

In the second position the hot beverage outlet is preferably arranged vertically above a receiving opening of the cooling reservoir, respectively inside of the contours of the receiving opening of the cooling reservoir when seen from above. In said second position, the beverage prepared by the brewing unit of the hot extraction module is dispensed in its initial hot state from the hot beverage outlet directly into the cooling reservoir. Therein, the beverage may then be brought to a lower temperature upon cooling.

The system preferably comprises a control unit which enables the control of the hot extraction module and the cold beverage preparation device. In a preferred embodiment, the hot extraction module and the cold beverage preparation device are designed for being controlled independently according to independent beverage modes. Thereby, the control unit is preferably designed to automatically set the preparation parameters of the hot extraction module and the cold beverage preparation device dependent on the beverage preparation position of the system.

The system preferably further comprises a user interface such as e.g. a graphical user interface adapted for enabling a selection of beverage preparation parameters dependent on the preparation position of the system.

The control unit and/or the user interface of the system is/are preferably connected to dedicated positioning sensors providing information about the beverage preparation position of the system.

The control unit and the user interface are preferably designed for providing a selected choice of the modes on the user interface such as e.g. short black coffee, long black coffee, iced cappuccino, long iced black coffee. Thereby, only selections compatible with the beverage preparation position of the system are preferably offered to the consumer.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIG. 1b is an exploded assembly drawing of the hot beverage extraction module according to FIG. 1a.

DETAILED DESCRIPTION OF THE FIGURES

Figure 1A:
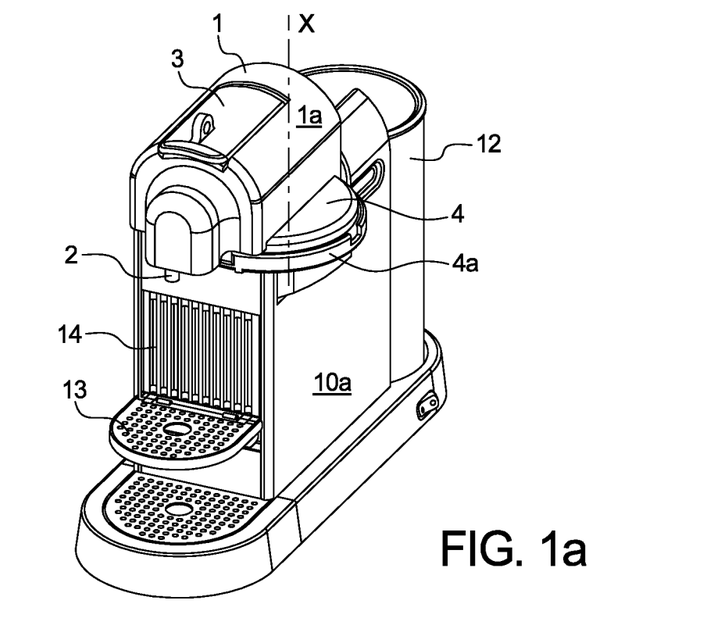
FIG. 1a is a perspective side view of a preferred embodiment of the hot beverage extraction module of the system according to the invention.
Figure 1B:
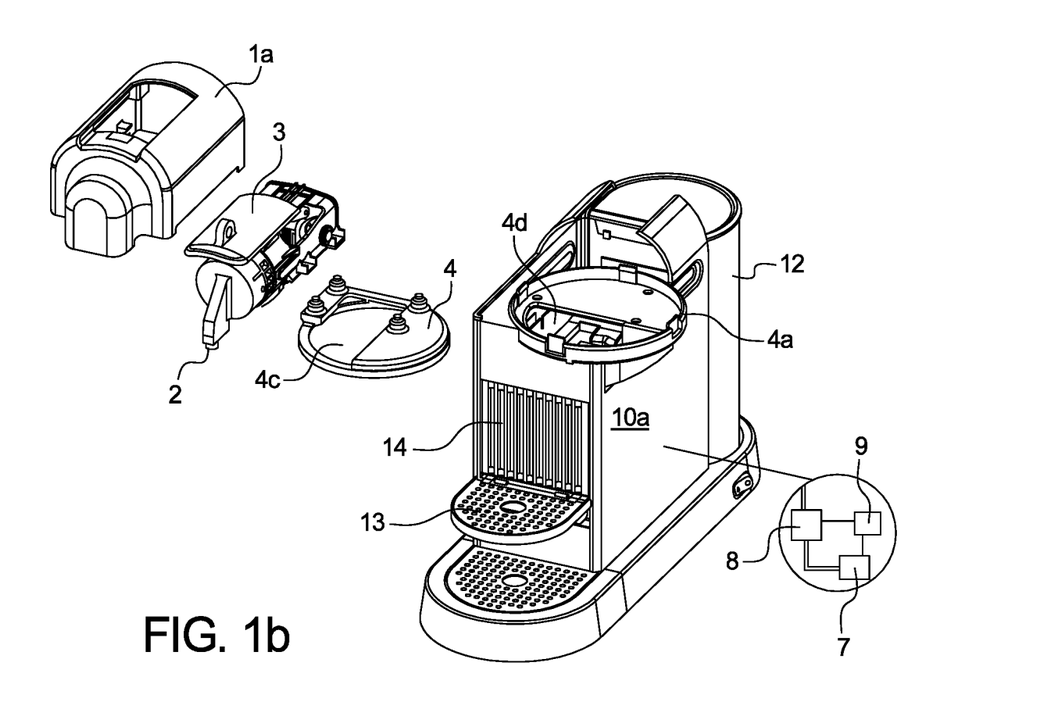

FIGS. 1a and 1b relate to a preferred embodiment of the hot extraction module 10 of the system 30 according to the invention.

The hot extraction module 10 comprises a housing 10a and a liquid reservoir or tank 12 selectively connectable to the housing 10a. The module 10 further comprises a pump 7 and heating means 8 such as a thermoblock, which are connected to the liquid reservoir 12 and a brewing unit 1 of the module 10. The hot extraction module 10 is thus designed for provision of a heated pressurized liquid into the brewing unit 1 of the module 10.

The module 10 further comprises a control unit 9 which is connected at least to the pump 7 and the heating means 8.

Figure 2:
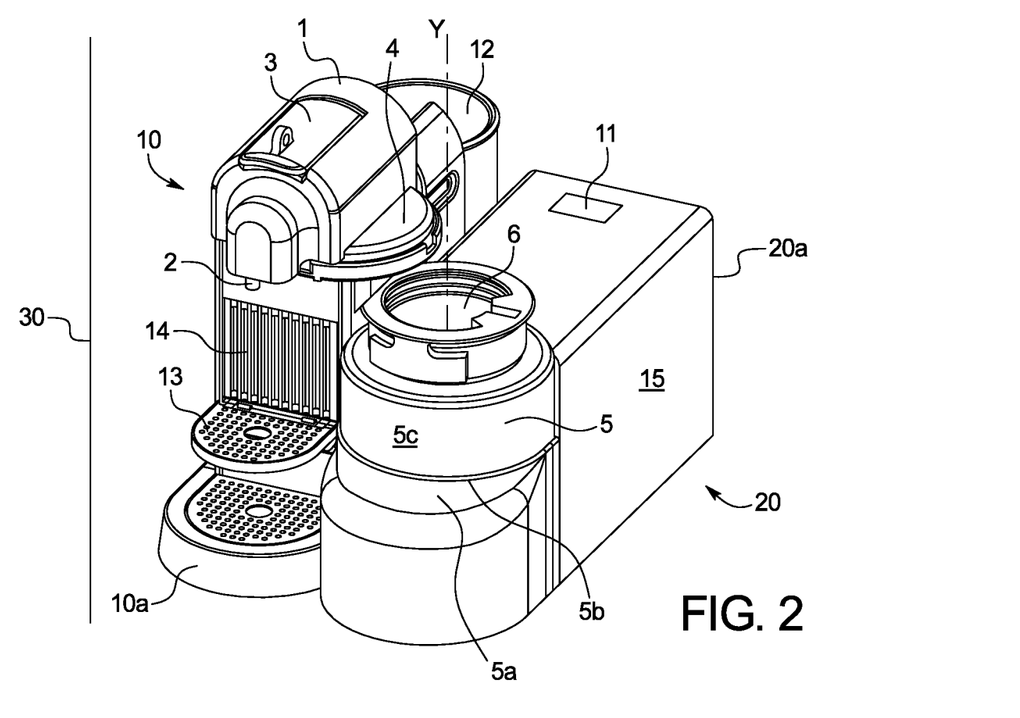
FIG. 2 relates to a preferred embodiment of the system according to the invention in a direct hot beverage preparation position.
Figure 3:
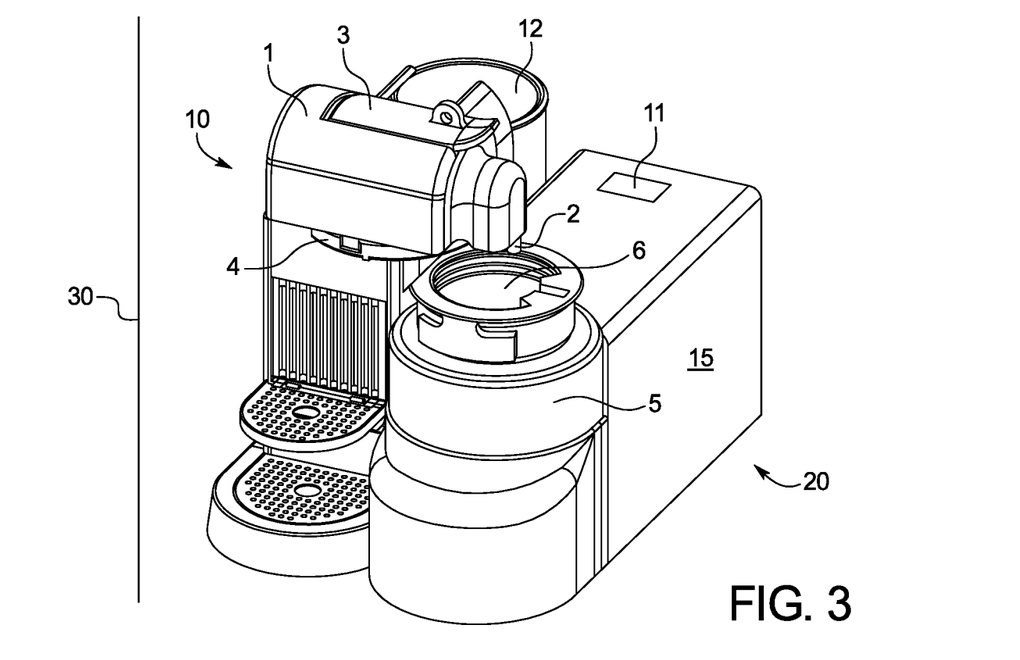
FIG. 3 relates to the embodiment of the system according to FIG. 2 in a cold beverage preparation position respectively in an indirect beverage preparation position.

The control unit may be connected to a user interface 11 of the system (see FIG. 2,3).

The brewing unit 1 of the module 10 comprises a hot beverage outlet 2 and a lid member 3 for selectively opening a slot sized for introduction of a capsule to the interior of the brewing unit 1. The slot is preferably connected to a brewing chamber of the brewing unit 1 in which the capsule is safely retained during injection of liquid thereto. The brewing unit 1 further comprises a housing 1a.

The brewing unit 1 is preferably arranged at a top portion of the hot beverage module 10, thereby forming an extraction head of the hot beverage extraction module 10.

The brewing unit 1 is connected to the module 10 respectively a housing 10a thereof by means of a rotationally movable platform member 4. The platform member 4 is arranged rotationally movable with respect to a supporting plate 4a of the module 10 respectively the housing 10a thereof. The platform member 4 enables the selective rotation of the brewing unit 1 and the hot beverage outlet 2 about a rotational axis X of the platform member 4. The brewing unit 1 is preferably adapted to rotate about at least an angle of 90° between a first hot beverage preparation position (see FIG. 1a) and a cold beverage preparation position (see FIG. 1b). The angle of rotation of the brewing unit 1 with respect to the housing 10a may however vary, preferably between 90° and 180°.

The platform member 4 and the supporting plate 4a preferably comprise vertical openings 4c,4d, arranged such as to allow the passing of a capsule ejected vertically downwards from the beverage brewing unit 1. In particular, upon activation of lid member 3 after the beverage preparation, the used capsule still contained within the brewing unit 1 may be ejected downwards from the brewing unit 1 through openings 4c,4d into a dedicated tray 14 for collecting used capsules. The openings 4c,4d are preferably shaped and aligned in vertical arrangement such that independent of the relative rotational position of the platform member 4 and the supporting plate 4a, a vertical transport of a capsule through openings 4c,4d is enabled.

The module 10 further comprises a support 13 onto which a receiving receptacle such as a coffee cup may be placed. In the hot beverage preparation position of the system as depicted in FIG. 1a, the hot beverage outlet 2 is arranged vertically above the support 13 for directly dispensing the hot beverage provided by the brewing unit 1 to a receiving receptacle.

FIGS. 2 and 3 relate to a preferred embodiment of the system 30 according to the invention. The system 30 comprises the hot extraction module 10 and a cold beverage preparation device 20. The hot extraction module 10 and the cold beverage preparation device 20 are preferably placed adjacent to each other. Thereby, the hot extraction module 10 and/or the cold beverage preparation device 20 may comprise dedicated connection means for establishing a fixed positioning there between.

The cold beverage preparation device 20 preferably comprises a cooling reservoir 5 that is preferably selectively connectable to support means 5a adapted to receive the cooling reservoir 5. Thereby, a bottom portion 5b of the reservoir 5 is preferably designed for being received by the support means 5a. The bottom portion 5b is preferably of conformal shape to the support means 5a (see also FIG. 4).

The cooling reservoir 5 is preferably of essentially cylindrical form and preferably comprises a receiving opening 6 arranged at a top portion thereof. A rotational axis Y of the cooling reservoir 5 and/or the receiving opening 6 is preferably arranged in parallel to an axis of rotation X of the brewing unit 1 of the system 30 (see FIG. 1a).

The cold beverage preparation device 20 comprises cooling means 15 connected to at least a portion of the cooling reservoir 5 when being placed in the support means 5a. The cooling means 15 enable the cooling of a liquid provided in the reservoir 5. The cooling means 15 are preferably connected to a control unit 21 of the cold beverage preparation device. Thereby, the control unit 21 is designed for setting at least a cooling temperature and a time for cooling the beverage contained within the reservoir 5. The cold beverage preparation device may as well be connected to the control unit 9 of the hot beverage extraction module 10.

The cooling means 15 are preferably arranged to cool at least a portion of the internal surfaces of the reservoir 5. The cooling means 15 may comprise a refrigerating circuit comprising a compressor, a condenser and an evaporator. The cooling means 15 are preferably adapted for providing a cooling temperature of between 5 to −30° C. within the reservoir 5. Thereby, the cooling means 15 are preferably adapted for providing a different cooling temperature in dependency of a beverage choice or input into a user interface 11 of the system 30.

In a first direct hot beverage dispensing position of the system as shown in FIG. 2, the brewing unit 1 of the hot extraction module 1 is rotatably arranged with respect to the cold beverage preparation device 20 such that the hot beverage outlet 2 is situated essentially vertically above the support 13 for a receiving receptacle. Accordingly, a hot beverage prepared by means of injection of hot pressurized liquid into a capsule provided to the brewing unit 1 will be dispensed via the hot beverage outlet 2 into a receiving receptacle placed by the user into the support 13 and below the outlet 2.

In order to prepare a cold beverage by means of the system 30, the user may rotate the brewing unit 1 of the hot extraction module 10 either manually or automatically, e.g. upon pressing a dedicated button or switch into the second cold beverage preparation position of the system 30 as depicted in FIG. 3.

In this second position of the system, the hot beverage outlet 2 is arranged vertically above a receiving opening 6 of the cooling reservoir 5. Hence, a hot beverage prepared by the brewing unit 1 of the hot extraction module 10 will be dispensed in its initial hot state from the hot beverage outlet 2 directly into the cooling reservoir 5. Therein, the beverage is then brought to a lower temperature upon cooling by the dedicated cooling means 15.

Further, a hot beverage provided to the cooling reservoir 5 may be subjected to mixing and/or foaming by means of dedicated stirring member or foaming means 16 arranged in the cooling reservoir 5 and which will be described further below with respect to FIGS. 4 and 5.

Foams are usually made by a mechanical force: small bubbles are formed by beating air into the liquid, such that bigger bubbles are broken into fine bubbles as shear force is applied. Foams are usually stabilized by the surfactant, the adsorption of proteins and solids fats (such as whipped cream), as disclosed in Source Food Materials Science and Engineering by Bhesh Bhandari-Yrjö H. Roos, for example.

In order to be able to reach iced foam with the cold beverage preparation device 20 of the invention, there are three steps to be taken into consideration, as will be described herewith.

First, a cooling process of the liquid occurs (under 5° C., preferably 4° C.±1° C.), with a lower speed or no speed of the rotational stirring member 16 and lower speed of the rotational scraping member 17 (preferably the rotational stirring member 16 and the rotational scraping member 17 rotate in opposite senses, but they can also rotate in the same sense).

Then, a foaming process of the liquid takes place (once the liquid is under 5° C., the speed of the rotational stirring member 16 having increased, beyond 2600 rpm preferably.

At last, a freezing/frozen process of the foam occurs in order to obtain iced foam (temperature around 0° C. and below 0° C. for sugar products, preferably of around −4° C.)

The cooling process permits to control and to ensure the foamability of the liquid and the stabilization of the foam by fat crystals appearing at lower temperature (under 5° C.) The foaming process is the mechanical force needed to incorporate air, break bubbles and fat crystals and therefore, create the froth/foam. The frozen process cools the froth until iced foam is obtained.

The final product is completely linked to the mixed cooling-foaming process executed by the cold beverage preparation device 20 of the invention.

The iced foam produced is different from an ice cream due to the air quantity and its temperature.

Ice cream usually has around 100% overrun (aeration) meaning that the air makes up 50% of the ice cream volume. Most commercial ice creams have an overrun of 75-100%, whereas the overrun of super-premium ice creams may be as low as 20%.

Using the cold beverage preparation device 20 of the invention, the iced foam obtained contains more than 50% of air (overrun higher than 100%), so has a very satisfying texturization.

The typical iced foam temperature is close to a soft serve: soft serve is a type of ice cream that is softer than regular ice cream, as a result of air being introduced during freezing; soft serve is preferably produced at a temperature of around −4° C. compared to ice cream, which is stored at −15° C.

After the preparation of the cooled or mixed beverage within the cooling reservoir 5, the user may disconnect the reservoir 5 from the support means 5a and may pour the final beverage through the opening 6 from the reservoir 5 into a dedicated receiving receptacle.

As shown in FIGS. 2 and 3, the system 30 may further comprise a user interface 11 that may be arranged at the housing 10a of the hot extraction module 10 or a housing 20a of the cold beverage preparation device 20. The user interface may be a graphical user interface and may comprise one or more buttons for displaying and selecting of dedicated operational functions of the system 30. The operational parameters and functions of the system that may be selected by the user are preferably dependent on the particular position of the system 30 respectively the relative position of the brewing unit 1 of the hot extraction module 10 with respect to the cold beverage preparation device 20.

In the first direct beverage preparation position as shown in FIG. 2, the user interface 11 is preferably adapted for enabling only a selection of parameters in relation to a hot beverage to be prepared such as e.g. the setting of the volume and strength of the hot beverage.

In the second cold beverage preparation position as shown in FIG. 3, the user interface 11 is preferably adapted for enabling only a selection of parameters in relation to the cold or chilled beverage to be prepared such as e.g. the final beverage temperature. In addition, the user interface 11 in this position of the system is adapted to enabling a selection whether the final beverage is to be mixed or foamed.

Figure 4:
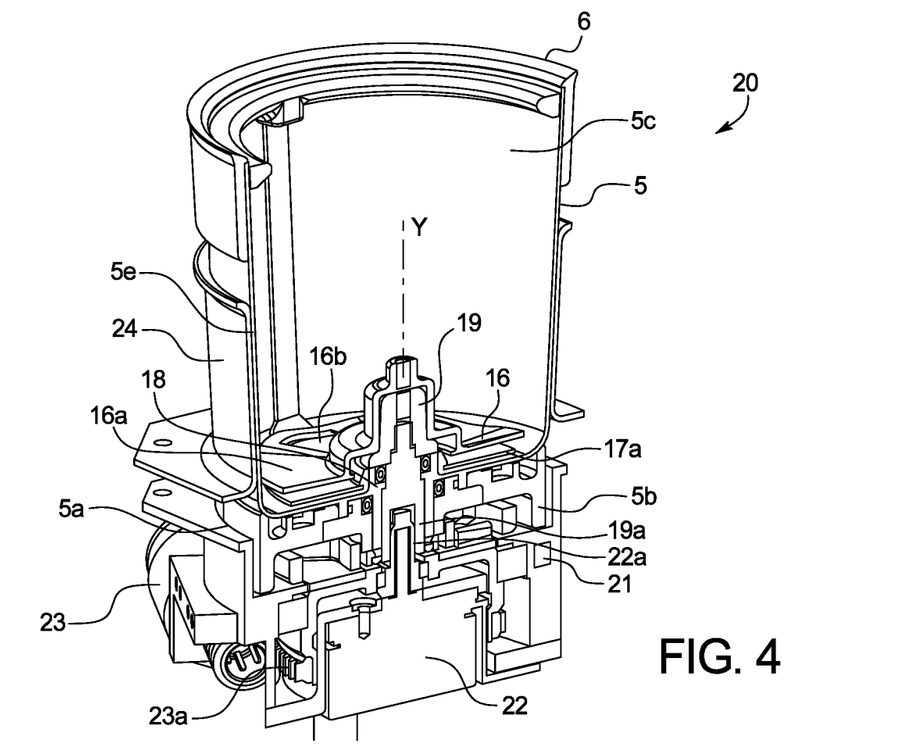
FIG. 4 is a perspective sectional side view of a preferred embodiment of the cold beverage preparation device.
Figure 5:
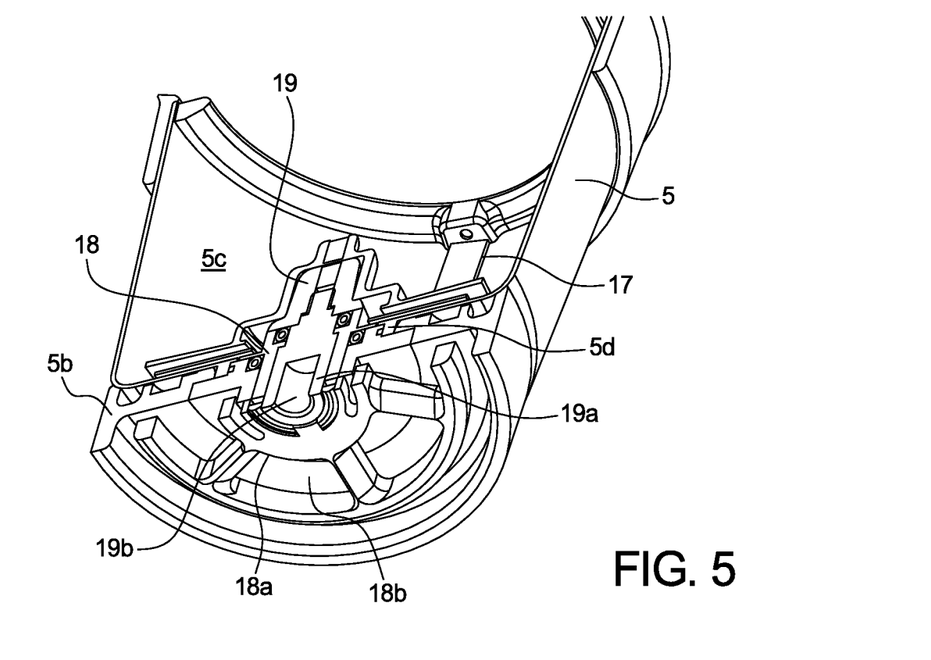
FIG. 5 is a perspective sectional bottom view of a preferred embodiment of the cooling reservoir of the cold beverage preparation device.

FIG. 4 relates to a sectional side view of the cold beverage preparation device 20 according to the invention.

As previously described in conjunction with FIGS. 2 and 3, the cold beverage preparation device 20 comprises an open cooling reservoir 5 for receiving the liquid beverage.

The cooling reservoir 5 when situated in the dedicated receiving means 5a of the device 20 is connected to the cooling means 15 of the device by means of a heat exchanging surface 24 which closely contacts an outer lateral surface 5e of the cooling reservoir 5 and thus enables the cooling of the interior surface 5c of the reservoir 5. The cooling reservoir 5e is preferably of a material having high heat conductivity such as in particular metal.

Within the cooling reservoir 5, a rotational stirring member 16 is arranged. The rotational stirring member 16 comprises an essentially disc-shaped base member 16a that is arranged centrally in the bottom area 5b of the cooling reservoir 5. The disc-shaped base member 16a comprises a plurality of mixing apertures 16b that are preferably arranged in a homogenous manner about the circumference of the disc-shaped base member 16a. The apertures are preferably designed for redirecting liquid from below the disc-shaped base member 16a to an upper surface of the disc-shaped member.

The stirring member 16 is rotatably supported within the reservoir 5. The disc-shaped base member 16a is connected to a vertical axle 19 arranged to protrude through the bottom surface 5d of the reservoir 5 at a center position. The centric axle 19 preferably comprises dedicated connection means 19a arranged at a center position at a bottom portion 5b of the reservoir 5 and which are designed for being selectively connected to dedicated driving means 22 upon placing the reservoir 5 on the support means 5a of the device 20. In particular, the connection means 19a may comprise a central recess 19b adapted for being connected to a driving axle 22a of the driving means 22 (see also FIG. 5). The driving means 22 is preferably an electric motor adapted to rotate the stirring member 16 at a rotational speed of between 100 to 5000 rpm.

The cooling reservoir 5 further comprises a rotational scraping member 17 arranged for scraping the internal surface 5c of the cooling reservoir 5. In particular, the scraping member 17 is designed for removing any ice crystals formed on the internal surface 5c of the reservoir 5. The internal surface 5c of the reservoir is preferably a smooth surface void of any protrusions and/or recesses.

The scraping member 17 preferably comprises a disc-shaped base member 17a arranged in vicinity to a bottom surface 5d of the reservoir 5. The disc-shaped base member 17a is preferably arranged below the base member 16a of the stirring member 16 and comprises a larger radial extension. From an outer circumferential portion of the disc-shaped base member 17a, a scraping beam preferably extends perpendicular to the disc-shaped base member 17a. The scraping beam is arranged for at least partially contacting the internal surface 5c of the reservoir. Hence, during rotation of the scraping member 17, the scraping beam will scrape off any liquid residua and/or ice crystals from the internal surface 5c.

The scraping member 17 is connected to a vertical axle 18 arranged to protrude through the bottom surface 5d of the reservoir 5 at a peripheral position and thus radially outside of the vertical axle 19 of the stirring member 16. The vertical axle 18 is connected to a rotatable disc member 18a (see FIG. 5) arranged at a bottom portion 5b of the reservoir 5 and which is designed for being selectively connected to dedicated driving means 23 upon placing the reservoir 5 on the support means 5a of the device 20. In particular, the disc member 18a may comprise a plurality of recesses 18b or suitable connection means adapted for being connected to a screw gear 23a connected to the driving means 23. The driving means 23 is preferably an electric motor adapted to rotate the scraping member 17 at a rotational speed of between 30 to 200 rpm.

Both the driving means 22 and 23 are preferably coupled to a control unit 21 of the device 20 and may be driven independently from each other. In particular, the driving means 22,23 are adapted for being driven at different times, for different time intervals or periods, at different speeds and/or in different directions.

It is noted that although the present invention has been described with reference to preferred embodiments thereof, many modifications and alternations may be made by a person having ordinary skill in the art without departing from the scope of this invention which is defined by the appended claims.

The invention claimed is:

1. A system comprising a cold beverage preparation device, the cold beverage preparation device comprising:
    an open cooling reservoir for receiving a liquid beverage;
    a cooling member associated with the open cooling reservoir for cooling at least part of an internal surface of the open cooling reservoir;
    a rotational stirring member arranged in the open cooling reservoir for mixing or foaming the liquid beverage depending on the speed of rotation of the rotational stirring member; and
    a rotational scraping member arranged in the open cooling reservoir for scraping the internal surface of the open cooling reservoir,
    the rotational stirring member and the rotational scraping member are configured for being driven independently within the open cooling reservoir of the cold beverage preparation device, the system further comprising a hot extraction module comprising a brewing unit for injection of hot liquid into a beverage ingredients containing capsule, the hot extraction module comprising a hot beverage outlet connected to the brewing unit for dispensing of a hot extracted beverage, wherein the hot beverage outlet and the open cooling reservoir of the cold beverage preparation device are arranged moveably relative to each other such that the hot extracted beverage may be selectively dispensed from the hot beverage outlet into the open cooling reservoir in at least one relative position of the hot beverage outlet and the cooling member.

2. The system according to claim 1, wherein the brewing unit of the hot extraction module is adapted for assuming at least two positions relative to the open cooling reservoir, the at least two positions including a first direct hot beverage dispensing position configured for delivering the hot extracted beverage directly from the hot beverage outlet into a receiving receptacle, and a second cold beverage preparation position configured for preparing a cold or chilled beverage in the open cooling reservoir.

3. The system according to claim 2, wherein in the first direct hot beverage dispensing position, the hot beverage outlet is arranged outside of contours of a receiving opening of the open cooling reservoir when seen from above.

4. The system according to claim 2, wherein in the second cold beverage preparation position, the hot beverage outlet is arranged vertically above a receiving opening of the open cooling reservoir and inside of contours of the receiving opening of the open cooling reservoir when seen from above.

5. The system according to claim 1, wherein the brewing unit of the hot extraction module is designed to rotate about a vertical axis of rotation into a predefined position.

6. The system according to claim 1, wherein the rotational stirring member and the rotational scraping member are configured for being controlled independently at different times, at different speeds and/or in different directions.

7. The system according to claim 1, wherein the rotational stirring member and the rotational scraping member are arranged to rotate about a common axis of rotation.

8. The system according to claim 1, wherein the rotational stirring member comprises a base member that comprises a disc arranged centrally in a bottom area of the open cooling reservoir.

9. The system according to claim 8, wherein the base member further comprises a plurality of mixing apertures.

10. The system according to claim 1, wherein the rotational scraping member comprises a peripheral scraping beam protruding from a base portion of the rotational scraping member.

11. The system according to claim 10, wherein the peripheral scraping beam is arranged in an orientation parallel to a rotational axis of the open cooling reservoir.

12. The system according to claim 1, wherein the rotational scraping member comprises a peripheral driving axle extending through a bottom surface of the open cooling reservoir.

13. The system according to claim 1, wherein the rotational stirring member comprises a central driving axle extending through a bottom surface of the open cooling reservoir.

14. The system according to claim 1, wherein the rotational stirring member is driven magnetically within the open cooling reservoir.

15. The system according to claim 1, wherein the cooling member is adapted for cooling the internal surface of the open cooling reservoir to a temperature between 5 to −30° C.

16. The system according to claim 1, wherein the device further comprises a heating member arranged in a bottom wall of the cooling reservoir for selectively heating the liquid beverage contained in the open cooling reservoir.

* * * * *